Oct. 31, 1933.    N. E. H. HUBBARD    1,932,935
APPARATUS FOR TEACHING FILING
Filed July 28, 1930    4 Sheets-Sheet 1

Inventor
Nelson E. H. Hubbard
By Bacon & Thomas
Attorneys

Oct. 31, 1933.  N. E. H. HUBBARD  1,932,935
APPARATUS FOR TEACHING FILING
Filed July 28, 1930   4 Sheets-Sheet 3
Fig. 3.
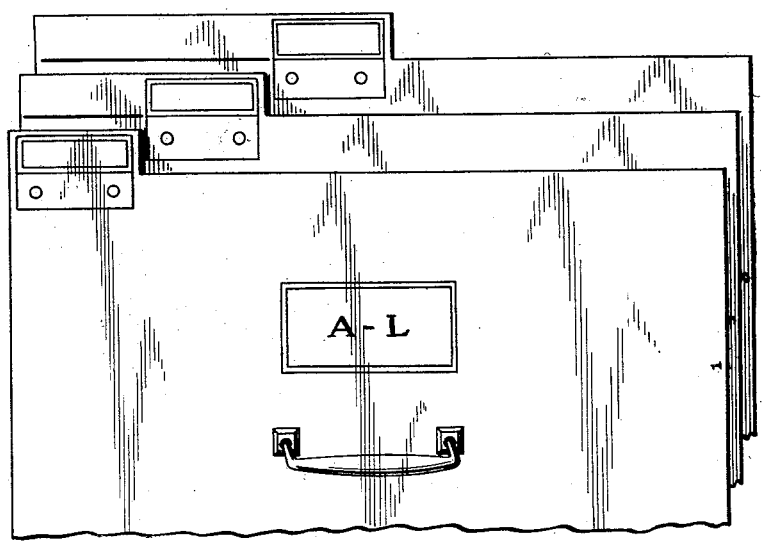
Fig. 4.
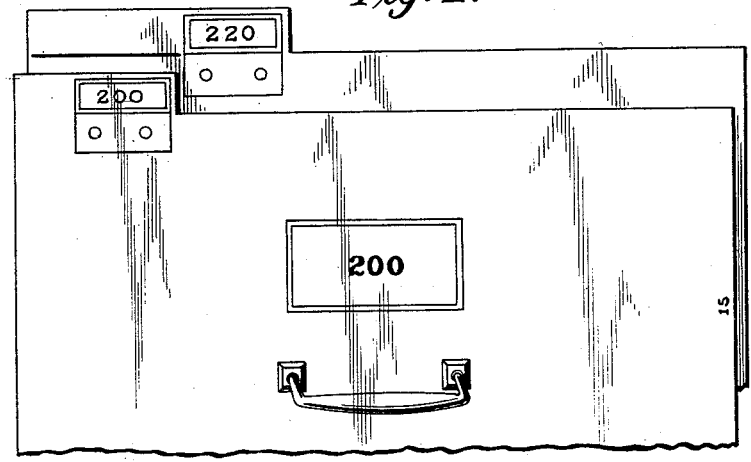
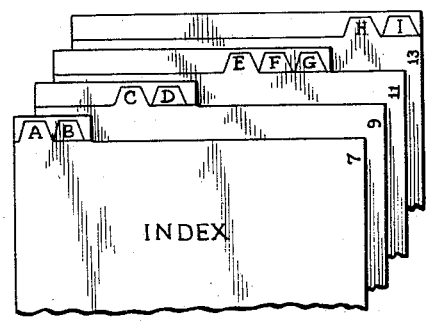
Fig. 5.
Inventor
Nelson E. H. Hubbard
By Bacon & Thomas
Attorneys Oct. 31, 1933.  N. E. H. HUBBARD  1,932,935
APPARATUS FOR TEACHING FILING
Filed July 28, 1930   4 Sheets-Sheet 4

Inventor
Nelson E. H. Hubbard
By Bacon & Thomas
Attorneys

Patented Oct. 31, 1933

1,932,935

UNITED STATES PATENT OFFICE 1,932,935

APPARATUS FOR TEACHING FILING

Nelson E. H. Hubbard, Brooklyn, N. Y., assignor to N. E. H. Hubbard & Company, Inc., New York, N. Y.

Application July 28, 1930. Serial No. 471,364

1 Claim. (Cl. 35—16)

My invention relates to novel and useful means to be used in connection with instruction in filing methods.

Instruction courses, available up to the present time for use in connection with the teaching of filing, are too elaborate to fit into the short period of time which can be allotted to this subject in the average business training curriculum. Furthermore, in connection with these instruction courses, it is necessary to use numbers of expensive and unwieldy file cases to illustrate to the students the principles underlying the various systems of filing, and to give to the students the means for obtaining practice in the operation of these systems. It is therefore impractical, under present systems of teaching this subject, to provide the individual students with sufficient laboratory material without incurring considerable expense, making the subject therefore a rather difficult and costly undertaking.

It is an object of my invention to provide a simplified course in filing which will overcome many of the difficulties attendant upon the present practices of instruction in this art.

It is a further object of my invention to provide a means in the form of an instruction manual which will include a text portion, illustrating the fundamental principles of filing, and a laboratory portion which, by means of an ingenious arrangement of pages, will provide the individual students with sufficient material to enable him to practice filing to a sufficient and suitable extent under the various systems now in use. My instruction manual can be procured by each student at comparatively small cost, and will enable him to have all necessary material in a complete, inexpensive, and easily portable form.

Referring to the drawings.

Figure 1:
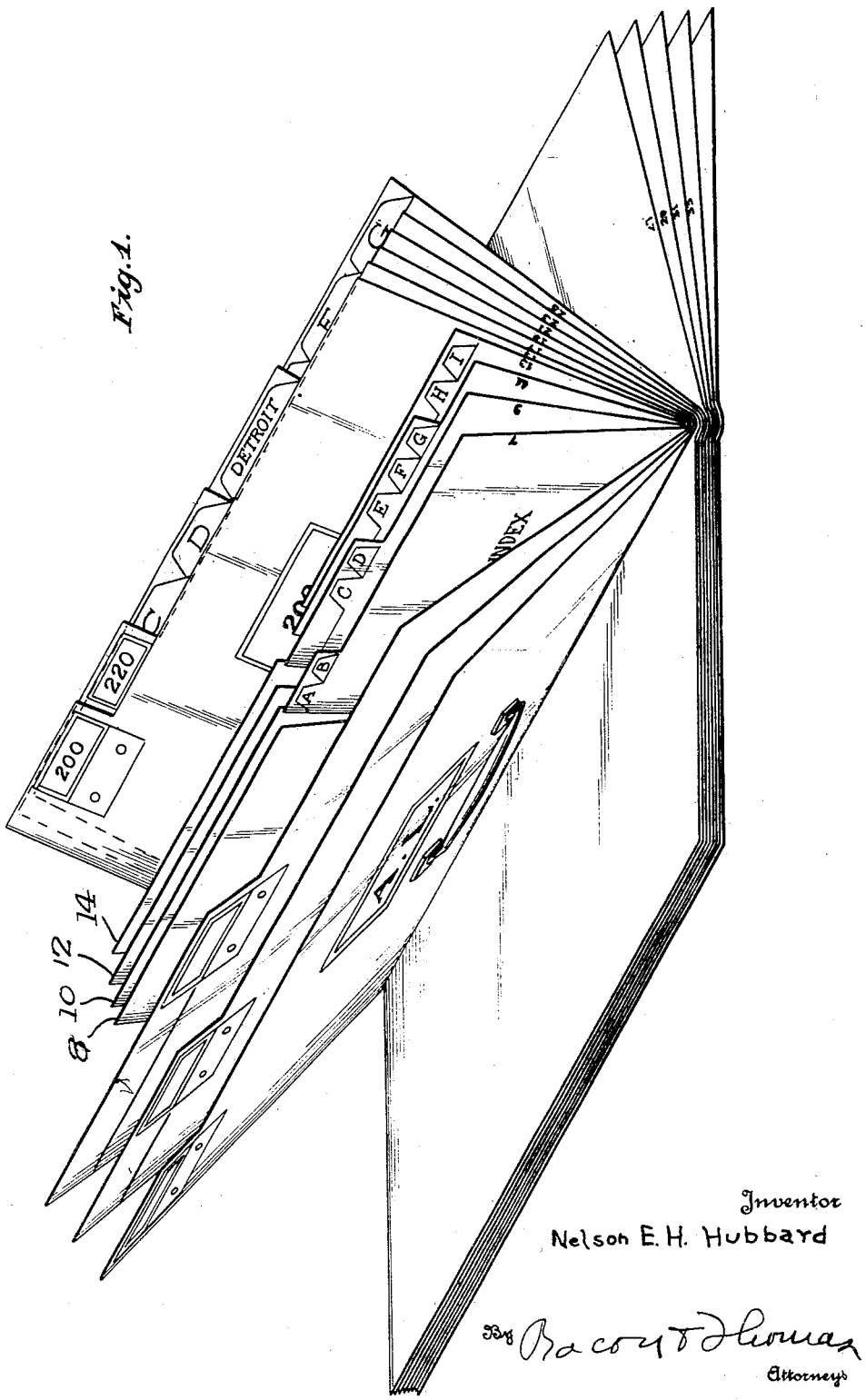
Fig. 1 is a perspective view of a preferred form of instruction manual illustrating my invention, the manual being shown partially opened to illustrate the arrangement of the pages.

Figs. 3 to 8, inclusive, show the various forms of files obtained by suitable arrangement of pages, in accordance with my invention, as will be hereinafter more fully described in detail.

In order clearly to indicate the nature of my invention, a brief description of the more commonly used systems of filing follows:

(1) *Alphabetical filing*

This is the commonest of filing systems. It depends for its principle upon the arrangement of letters or the like by name, according to the letters of the alphabet.

The simplest alphabetical file employs the set of alphabetical guides, A, B, C, D, etc., and no attention is paid to second and succeeding letters in the name or word according to which the material is filed. The second and following letters of the name may be made use of, where expedient, in the same manner as the first letters, as will be understood.

Sometimes it is advisable to use a guide which will include several letters of the alphabet; for example, A–C, D–G, etc.

In connection with alphabetical and other systems of filing, it is very frequently advisable to use cross referencing means. By way of example, where letters are received under the name of two different companies, and where letters are likewise received under the name of one who is associated with both companies with relation to dealings with the companies, it is advisable to file the letters, respectively, under the names of the companies, and to insert a cross reference sheet bearing the name of such person, and referring to the companies in question. Such a sheet will usually take the following form:

Cross reference

Name_____
See_____

When papers are removed from a file, it is wise to put some record in their place to show where they have gone. One way of accomplishing this is to require anyone who desires a letter to make out a requisition slip. The one in charge of the files then inserts this slip in a pocket with a card whose projecting tab says— "Out". This "out" guide with its slip is placed in the folder instead of the paper or papers removed.

(2) Subject filing

It is sometimes expedient to file according to the subject matter rather than by name. This system is used frequently in inventory filing systems. The tabs of the guides in files of this sort bear the name of the subject under which the material is filed. The order of such subjects is usually alphabetical.

(3) Numerical filing

In some cases it may be desirable to file correspondence under the name of the letterhead or under the name of the person signing the letter or under the subject about which the letter is written. This may be taken care of in an alphabetical file by cross referencing, but too much of this would fill the files with cross reference sheets, leaving little room for correspondence. Anyone who has occasion to do much cross referencing prefers the numerical file in which the material to be filed is placed in a numerical folder or envelope in back of a numbered guide. A card index, alphabetically arranged, is used to keep track of the numbered guides. Such card index bears the name and the number corresponding to it. The cards are filed according to the alphabetical order of names.

(4) Geographic filing

Filing of this type is done according to location. It frequently is useful where a company will have correspondence covering the entire country. The filing will be done by alphabetical guides which will indicate where to find the names of states, cities, towns, and the like. Frequently, it is desirable to have a complete drawer labeled by a state name and subdivided by alphabetical guides for the cities and towns. If a city if large enough to warrant, a special guide may appear with the name of the city on the tab, and placed in its proper alphabetical position.

Other systems commonly used in connection with the above systems are:

(5) Visible filing

In a visible file, cards are inserted into pockets in such a way that the lower edge of each card projects below the card above. The names are written, typed, or printed on the lower edge of the card, instead of at the top as in a vertical file. The names are ordinarily arranged alphabetically. When consulting any one of the cards, those above it are lifted. In a visible file, the cards are arranged in horizontal position superposing each other as indicated.

(6) Tickler filing

This file is a follow-up file, used for calling to mind things to be taken care of in the future. The tickler file is provided with month guides in back of which are guides provided with tabs having dates printed on them. A tickler file will have a set of thirty-one (31) guides, one for each day of the month. To illustrate the use of this guide; if something is to be taken care of on a particular day on the current month, a card is made out with the necessary information on it, and is filed behind the guide corresponding to the particular day which the matter refers to.

Figure 2:
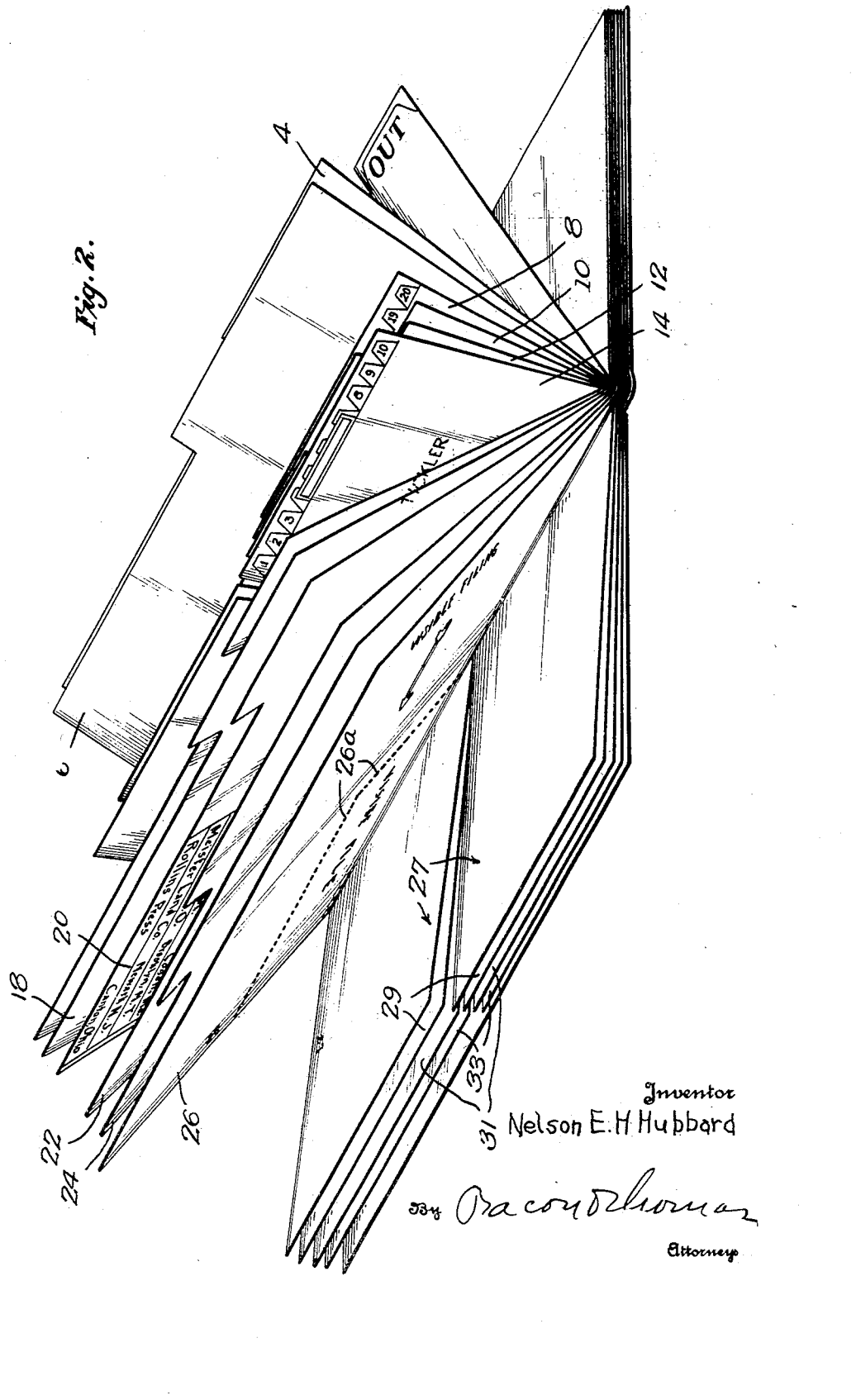
Fig. 2 is a similar view of the manual taken in perspective from the rear of the same.

To illustrate the manner in which the instruction manual, embraced in my invention is used, referring to Figs. 1 and 2, the front portion of the book, represented in the drawings by blank pages, is printed in the form of a handbook which is intended to contain an outline of the principles of filing, and the terms commonly used in connection therewith. It also describes the various systems of filing and how to use them. The latter portion of the book, as shown in Figs. 1 and 2, contains a number of pages adapted to serve as guides for the various laboratory manipulations. Several of these pages are printed to form miniature letters, cross reference sheets, and the like. In addition to serving as practice material, the sheets in the latter portion of the manual may be likewise printed for the purpose of giving instructions in the use of the files. As will be noted, the pages in the practice portion of the book are suitably ruled to be cut out for the formation of tabs, and to be subdivided for purposes which will be understood from the following detailed description.

Alphabetical filing

Courses in filing most logically begin with instructions on how to use alphabetical files.

Referring to Figs. 1 and 2, pages 1, 3 and 5, will serve as a form of alphabetical index. This will show the first part of an alphabetical file with projecting tabs. These tabs will be printed with pencil as follows:

On first tab ---------------------------- A–C
On second tab --------------------------- D–G
On third tab ---------------------------- H–L It will be seen from the drawings, (Figs. 1 and 3), page 1 is printed with letters A–L. Pages 27, 29 and 31, which are divided transversely, as shown in Fig. 2, are printed in the form of miniature letters bearing the proper identifying material, such as letterheads, dates, signatures, subject matter, and the like, and after said pages are detached from the manual, practice may be had by the student in filing these letters in their proper places behind the alphabetical guides, the letters being laid along their longitudinal edges with the letterhead always to the left.

Page 33 is also divided transversely and may be detached from the manual to form cross reference sheets. Using these cross reference sheets, the student may practice cross referencing using the miniature letters already used in connection with the previous filing practice.

Subject filing

For practice in subject filing, the letters which were printed in pencil on pages 1, 3 and 5, are erased, and in place thereof the tabs are lettered with suitable subject names; for example, adding machines, furniture, wearing apparel, etc. The student may then sort the miniature letters according to the subject matter, with relation to their relative positions behind the guides bearing the subject names.

Numeric filing

Pages 7, 9, 11, 13, 15 and 17 represent a numeric file and card index. The tops of pages 7, 9, 11 and 13 are provided with lettered tabs, (see Figs. 1 and 5), while pages 15 and 17 are numbered as shown in Fig. 1, and represent a numeric file drawer as shown in Fig. 4. The miniature lettered cards formed from pages 7, 9, 11 and 13 represent a model card index, as shown in Fig. 5.

The student may take the miniature letters used in alphabetical filing and file them under the numeric filing index. The index cards are numbered, the name of the company referred to in the miniature letters are written on the cards under the respective numbers, and the cards are filed in the alphabetical index. The letters, of course, are filed under the numerical index and may be kept track of by the index cards in the card index.

Cross indexing may be practiced similarly to the cross referencing described in connection with the alphabetical index, using cards instead of letter-sized sheets.

Out guide

The sheets used for numeric cross indexing may be utilized as requisition slips for out filing. Page 1 is torn out. It will be noted that page 2 bears the word "Out" on the tab at its upper edge. Requisition slips may be made out by the student and attached to the out guide in any suitable manner as by bending over the corners of the out guide. The out guide may then be inserted in its place. Practice may be had by the student by removing the correspondence from the numeric guide and filing requisition slips by means of the out guide.

Geographic filing

Figure 6:
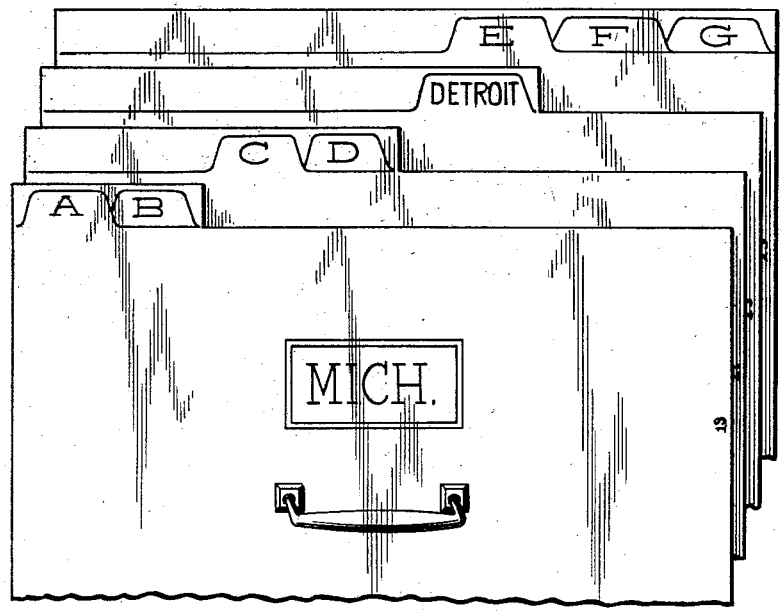

The tops of pages 19, 21, 23 and 25 are provided with lettered tabs, (see Fig. 6). As indicated on page 19, the label on the outside of the drawer shows the State; in this case, Michigan. The alphabetical guides are for city and town names, and special sub-guides, in this case, the Detroit guide, are provided for the larger cities. This composite geographic file is shown in Fig. 6.

The student may now practice filing by taking the model letters and inserting each letter in its proper place according to its respective locality.

Visible filing

Figure 8:
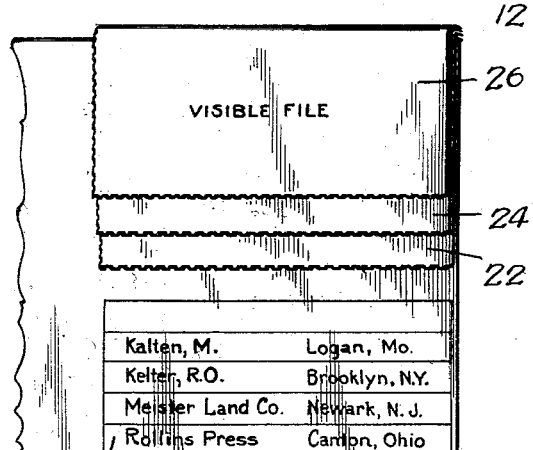

As shown in Fig. 2, page 26 carries a card to be torn on lines 26a, and to produce a typical visible file, the adjacent pages 24 and 22 will also be provided with similar cards, and when said cards are arranged as shown in Fig. 8, each card projects below the one immediately above. Page 20 bears a number of names which give a visual representation of overlapping cards, the names corresponding to each being visible. The cards represented on pages 26, 24 and 22 may be lettered by the student in accordance with the minature letters which have been used in the other systems of filing, the bottom portions of the pages bearing the names and localities, which are placed on the cards so as to be visible. It will be seen that in order to consult the cards, the name appearing at the bottom of each card is noted and in order to inspect any card those above it are lifted.

Tickler file

Figure 7:
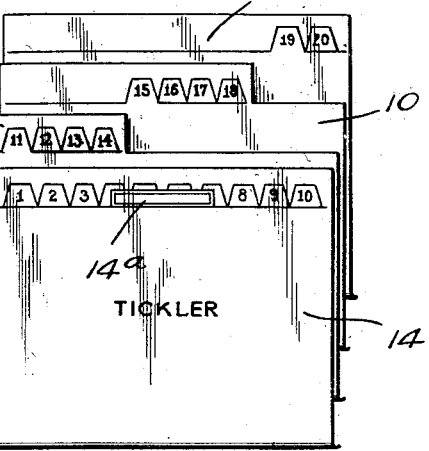

Pages 14, 12, 10 and 8 show a typical "Tickler file." The guides formed by said pages bear numerals representing days of a month, as shown in Fig. 7, wherein it will be noted that page 14 is provided with a tab 14a on which the name of the current month may be printed.

The small cards used for the numeric index may be made use of in practicing filing under the tickler. The memorandum cards may be provided with a notation referring to a certain date, and will be filed in the tickler according to the date guide.

In the practice portion of the manual, it is important that the instructions as to the use and practice of the various files be placed conveniently with respect to the different files to be formed. For example, instructions relative to the alphabetical index are contained on the pages immediately preceding page 1. At the end of the pages containing these instructions, there will be a notation as—"See subject filing—page 4". The instructions relative to subject filing will occur on page 4 and at the bottom of that page, after completing the instructions, a notation will be made to "Consider numeric filing—page 5". The instructions relative to numeric filing will be printed on pages 5 and 6. At the bottom of page 6, after completing the instructions upon numeric filing, reference will be made to see "Out guide—page 3". At the bottom of that page, after finishing with out guide filing, a notation will be made to see "Geographic filing—page 18". At the bottom of that page, a notation will refer to "Visible filing—page 26". Instructions as to detaching portions of the pages forming the visible file will occur on each page, and on the last page of the visible file; namely, page 20, reference will be made to the "Tickler—page 17".

It will be seen that the arrangement of instructions relative to the use of the practice portion of the manual is conductive to an orderly study of the subject. The student first takes up one system of filing, at the same time studying the instructions relating to this system, and then is referred to a system to be taken up immediately after finishing with the preceding system, the instructions for the systems to be taken up in succession, being placed in a convenient position so that the student may study the instructions and manipulate the files at the same time. The association of instructions for the use of the files with each individual file insures an automatic check-up on all lessons. It also makes certain that the study of the subject will be complete and logical.

From the above description, it will be seen that the arrangement contained in the manual is very convenient for a short, simple and satisfactory analysis of the principles of filing and the practice in utilizing these principles. The arrangement of pages is very economical, and yet covers the practice necessary for proper handling of filing systems in a precise and complete manner.

All the lessons and exercises are arranged to check automatically so that the teacher's work is reduced to a minimum. It will be apparent that the manual embraced in my invention is adapted equally well to class instruction and to individual work.

It will be evident from the above description and the corresponding drawings, that I have invented a practical means for use in filing courses which is novel and which lends itself to a much more simplified method of teaching. By the use of the same, a very satisfactory idea of indexing and the various filing systems may be obtained in a comparatively short period of time and at small expense.

Certain changes suggest themselves with respect to the arrangement of the pages in my manual and of the manner of including instructions as to the use of the same. I consider such changes to be within the scope of my invention.

Different and/or additional systems, equipment and text matters as well as alteration in the style of binding may be incorporated without departing from the concept of my invention.

I claim as my invention:

In a device for filing instruction courses, the combination in a unitary structure forming a booklet, of a text portion containing general information relating to filing theory and practice, a file portion comprising a series of pages cooperating to form the elements of a plurality of types of letter files, certain of said elements having visible tabs and having detailed filing instructions thereon, said file portion adapted to be used by a student to practice filing papers between the elements thereof according to the instructions in the text portion and on the file elements, and a third portion comprising a series of letters adapted to be detached from the booklet and used as practice papers by the student, certain of said file elements being provided with means indicating where parts of the elements may be detached such that the remaining portions represent elements of a visible card index.

NELSON E. H. HUBBARD.